R. F. COOK.
Sight for Fire-Arms.
No. 224,651. Patented Feb. 17, 1880.
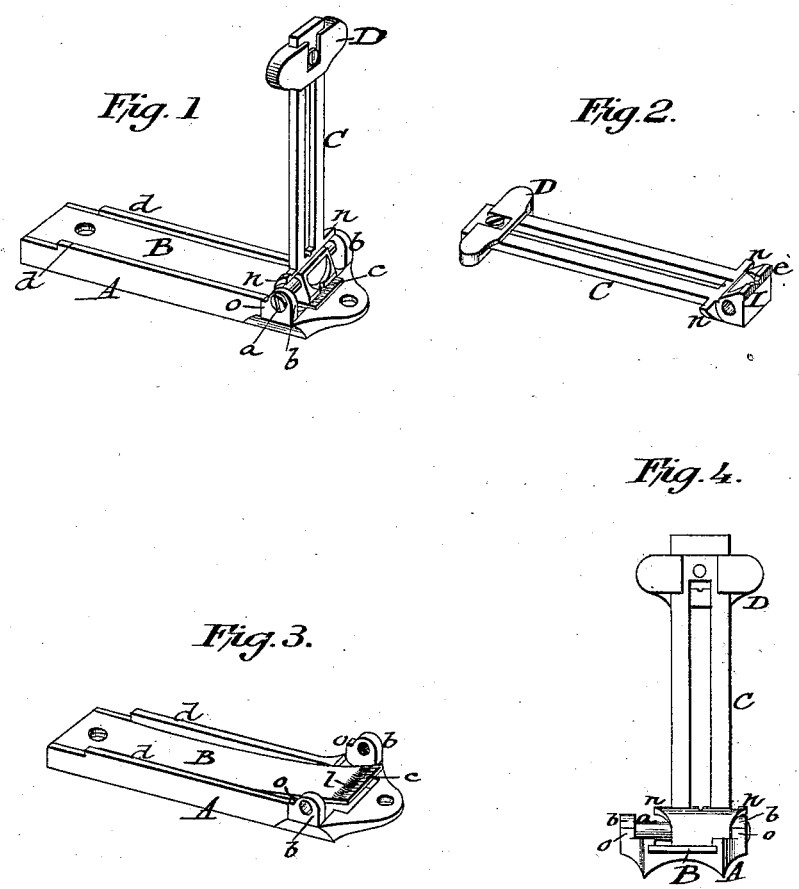

UNITED STATES PATENT OFFICE.

ROSWELL F. COOK, OF ILION, NEW YORK.

SIGHT FOR FIRE-ARMS.

SPECIFICATION forming part of Letters Patent No. 224,651, dated February 17, 1880.

Application filed January 12, 1880.

*To all whom it may concern:*

Be it known that I, ROSWELL F. COOK, of Ilion, in the county of Herkimer and State of New York, have invented certain Improvements in Sights for Fire-Arms, of which the following is a specification.

My invention relates to sights for guns; and the invention consists, first, in so constructing the hinged leaf of the sight that it can be readily moved or adjusted laterally to compensate for the force of the wind, and to do this without the use of a screw or tool of any kind, so that it may be readily and quickly adjusted by the soldier or other person using the gun while in action, hunting, shooting at a target, &c.; secondly, it consists in so constructing the parts that, while the leaf can be freely moved or adjusted by the fingers, it will be locked fast against accidental movement when elevated for use; and, thirdly, in so constructing the parts as to automatically throw or force the leaf to a central position when turned down, all as hereinafter more fully described.

Figure 1 is a perspective view of the sight. Fig. 2 is a perspective view of the leaf detached, and Fig. 3 is a similar view of base-plate and spring. Fig. 4 is a front elevation of the sight with the leaf raised.

Various methods have been resorted to heretofore in the construction of what are termed "wind-gage sights" for fire-arms; but so far as I am aware they have all been constructed with screws or some similar device for effecting the adjustment, and sometimes so as to require the use of tools.

The object of my present invention is to make such a sight in such a manner that it can be instantly adjusted by the hand alone, and so it will be securely held where adjusted until the leaf is shut down. To do this I make use of the ordinary base-plate A, spring B, and hinged leaf C, as represented in the drawings, the leaf C being provided, as usual, with a flat base or foot piece, I, against which the spring C bears to hold it upright when raised, as in Figs. 1 and 4, and which also serves to hold it down when shut down.

As shown in Figs. 1 and 4, I make the space between the ears $b$ of the base-plate A considerably wider than the leaf C is, and then hinge the leaf to these ears by a smooth pin, $a$, so that the leaf C can readily be moved to and fro between the ears $b\ b$ by simply taking hold of it with the hand, tipping it slightly forward, and shoving sidewise on it. By this means it can be instantly adjusted to the right or left, as may be desired, to compensate for the lateral drift of the bullet by the force of the wind from one or the other side.

In order to hold it securely in place when adjusted, I make upon the toe $e$ of the foot-piece a series of teeth similar to those of a file, (see Fig. 2,) and upon the face of the spring B, at the point where the toe $e$ rests when the leaf is elevated, I make a similar series of teeth and indentations, as shown at $l$, Fig. 3, so that when the leaf is elevated these teeth and indentations on the two parts will interlock, and thus prevent any lateral movement of the leaf C. Upon the spring B, just in front of the toe $e$ of the leaf, I also make a series of graduation-marks, $c$, by which to regulate the adjustment, as shown in Figs. 1 and 3.

As usual in sights for military arms, the base-plate A is provided with ribs $d$ at each side, between which the leaf rests when turned down to prevent injury to the leaf or its hinge-pin by rough usage or accident; and in order to cause the leaf C to assume a central position, so as to fall between these ribs when shut down, I provide the leaf C with an inclined projection, $n$, on each side, as shown in Figs. 1, 2, and 4, they being so located as to strike against the inner faces of shoulders $d$, which are made to project from the ears $b$ on one side for that purpose, so that as the leaf falls these inclines $n$ will force it to the center, from whichever side it may have been moved to in adjusting it.

As the hinge-pin $a$ is smooth, and as the interlocking teeth are removed from contact with each other as soon as the leaf is turned slightly from its upright position, the leaf is free to move laterally as it falls, the pressure of the spring on the heel of the foot-piece I, as soon as the leaf has been turned more than halfway down, serving to impart to the leaf sufficient momentum to force it entirely down, notwithstanding the friction of the leaf on its hinge-pin and the resistance of the shoulders $d$ operating against the inclines or cams $n$.

To adjust the leaf when raised, it should be tipped forward far enough to disengage the interlocking teeth, when it can be readily moved to either side, and as soon as released the spring operating against the bottom of the foot-piece I instantly throws it to an upright position, causing the teeth to interlock again, thus securing it in position.

It will at once be seen that the cost of making a sight on this plan is but a trifle more than the ordinary sight, and that it enables the soldier or person using the arm to adjust it instantly without the use of tools, and that when adjusted it is held securely in position, and is as securely protected by the ribs of the base-plate when shut down as is the ordinary sight as now made.

While I have shown my improvements as applied to a sight for a military arm, it is obvious that the invention may be applied to sights for sporting-arms equally well.

Having thus described my invention, what I claim is—

1. The combination, in a gun-sight, of a laterally-adjustable leaf or sight-piece, C, the smooth hinge-pin $a$, secured at its ends to the ears or similar holding devices, and a spring, B, for holding the leaf in position, all arranged to operate substantially as described, whereby the leaf can be adjusted by hand at the will of the operator, as set forth.

2. The laterally-adjustable leaf or sight C, in combination with a holding-spring, B, said leaf and spring being provided with interlocking teeth or projections, arranged to operate substantially as described.

3. The laterally-adjustable and hinged leaf or sight C, provided with the inclines or cams $n$ $n$, arranged to operate upon the shoulders $d$ or similar projections and force the leaf to its proper position for entering the recess upon the base-plate as the leaf is shut down, substantially as herein described.

ROSWELL F. COOK.

Witnesses:
S. ZIMMERMAN,
W. W. BENEDICT.